United States Patent [19]
Eibner et al.

[11] Patent Number: 4,954,979
[45] Date of Patent: Sep. 4, 1990

[54] PERSONAL COMPUTER WITH MULTIPLE INDEPENDENT CRT DISPLAYS OF IDEOGRAPHIC AND/OR ASCII CHARACTERS HAVING LOADABLE FONT MEMORY FOR STORING DIGITAL REPRESENTATIONS OF SUBSET OR SPECIAL CHARACTERS

[75] Inventors: Jules A. Eibner, Dresher; Jean-Pol Zundel, Berwyn, both of Pa.

[73] Assignee: Unisys Corporation, Blue Bell, Pa.

[21] Appl. No.: 767,399

[22] Filed: Aug. 22, 1985

[51] Int. Cl.$^5$ ............................................. G06F 12/02
[52] U.S. Cl. .................................. 364/900; 340/735; 340/790; 364/966.1; 364/960; 364/955
[58] Field of Search ................................. 340/735, 790; 364/200 MS File, 900 MS File; 400/484, 110

[56] References Cited

U.S. PATENT DOCUMENTS

| | | | |
|---|---|---|---|
| 3,500,336 | 3/1970 | Cuccio | 364/900 |
| 4,100,601 | 7/1978 | Kaufman | 364/200 |
| 4,122,533 | 10/1978 | Kubinak | 364/900 |
| 4,124,843 | 11/1978 | Bramson et al. | 340/735 |
| 4,202,041 | 5/1980 | Kaplow | 364/900 |
| 4,251,871 | 2/1981 | Yu | 400/110 |
| 4,271,479 | 6/1981 | Chesolka et al. | 364/900 |
| 4,327,421 | 4/1982 | Wang | 400/484 |
| 4,462,703 | 7/1984 | Lee | 400/484 |
| 4,527,252 | 7/1985 | Donohue | 364/900 |
| 4,562,535 | 12/1985 | Vincent | 364/200 |
| 4,602,878 | 7/1986 | Mernere | 400/484 |

FOREIGN PATENT DOCUMENTS

| | | | |
|---|---|---|---|
| 0137991 | 4/1985 | European Pat. Off. | 340/365 UL |
| 52-15232 | 4/1977 | Japan | 340/365 UL |
| 2116341 | 9/1983 | United Kingdom | 400/484 |

OTHER PUBLICATIONS

*Computer*, Jan. 1985, "Chinese/Kanji Text and Data Processing", pp. 11, 12, 18–24, 27–34, 37–52, 54–63, 65, 66 & 80–87.

*Primary Examiner*—Lawrence E. Anderson
*Attorney, Agent, or Firm*—Griffin, Branigan & Butler

[57] ABSTRACT

A plurality of language display control cards are provided for insertion into the motherboard of a personal computer, each card having connector means to which a CRT display and a keyboard may be connected. Each card controls its display independently of the others so that different data may be displayed on each display screen. A display control card includes a font memory for storing the digital video representations of ideographic characters of a standard code, and an ASCII memory for storing the digital video representations of ASCII characters. In addition a loadable font memory is provided for storing the digital video representations of characters which are not commonly used characters of a language but may be frequently used in a particular application. The outputs of the three memories may be serially interspersed so that the CRT may display ASCII, or ideographic characters or a mixture of both. To reduce the size of the font memory, a translator memory is provided for converting non-sequential numbers representing the characters of a standard internal code used by the PC into a sequence of consecutive numbers for addressing the font memory.

12 Claims, 8 Drawing Sheets

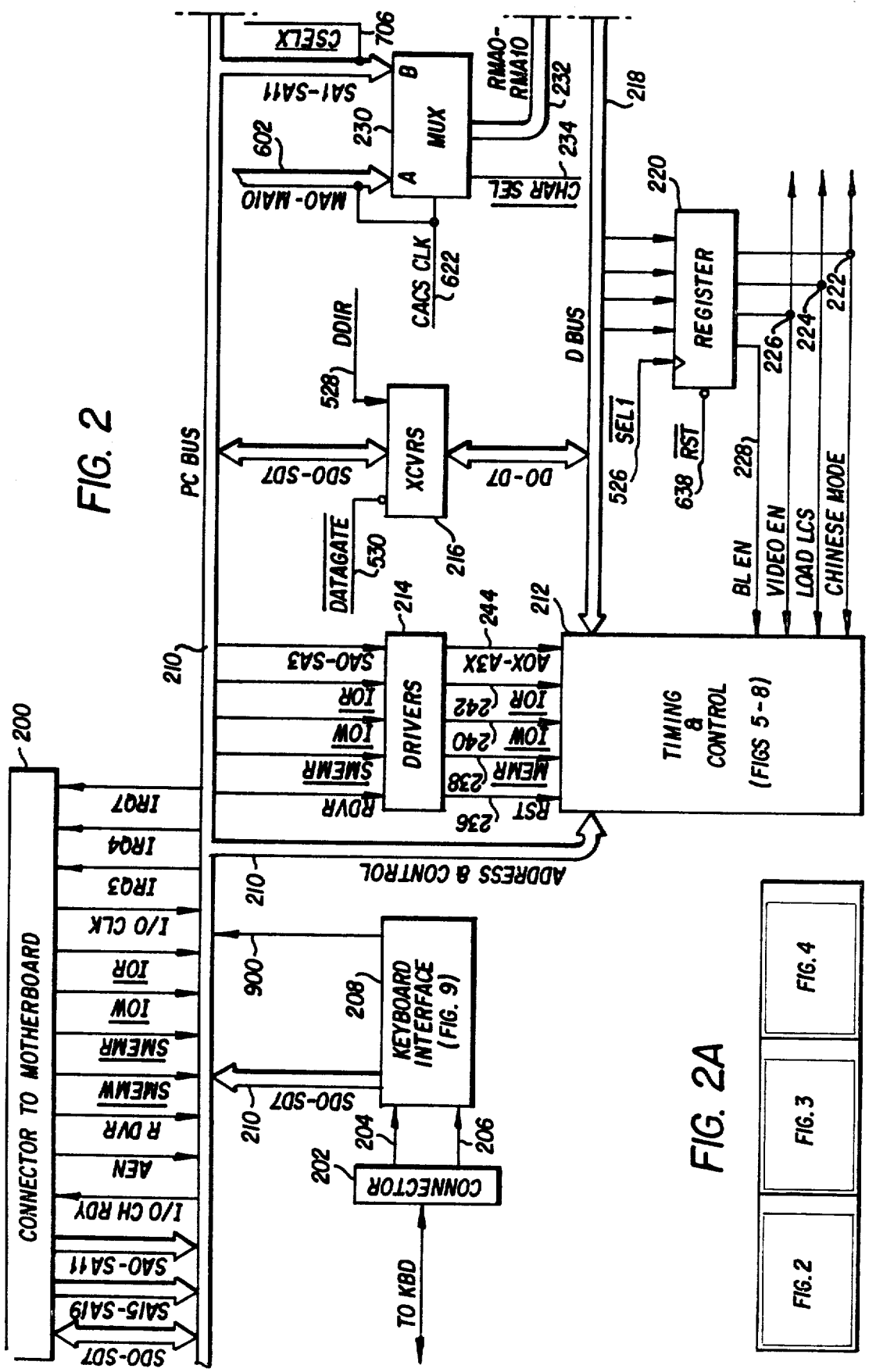

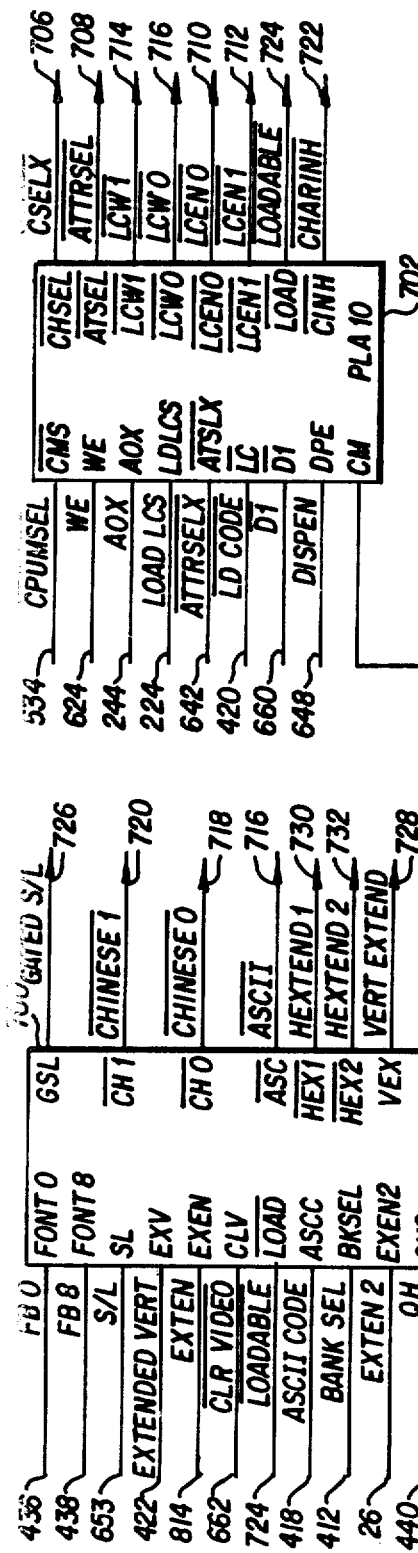
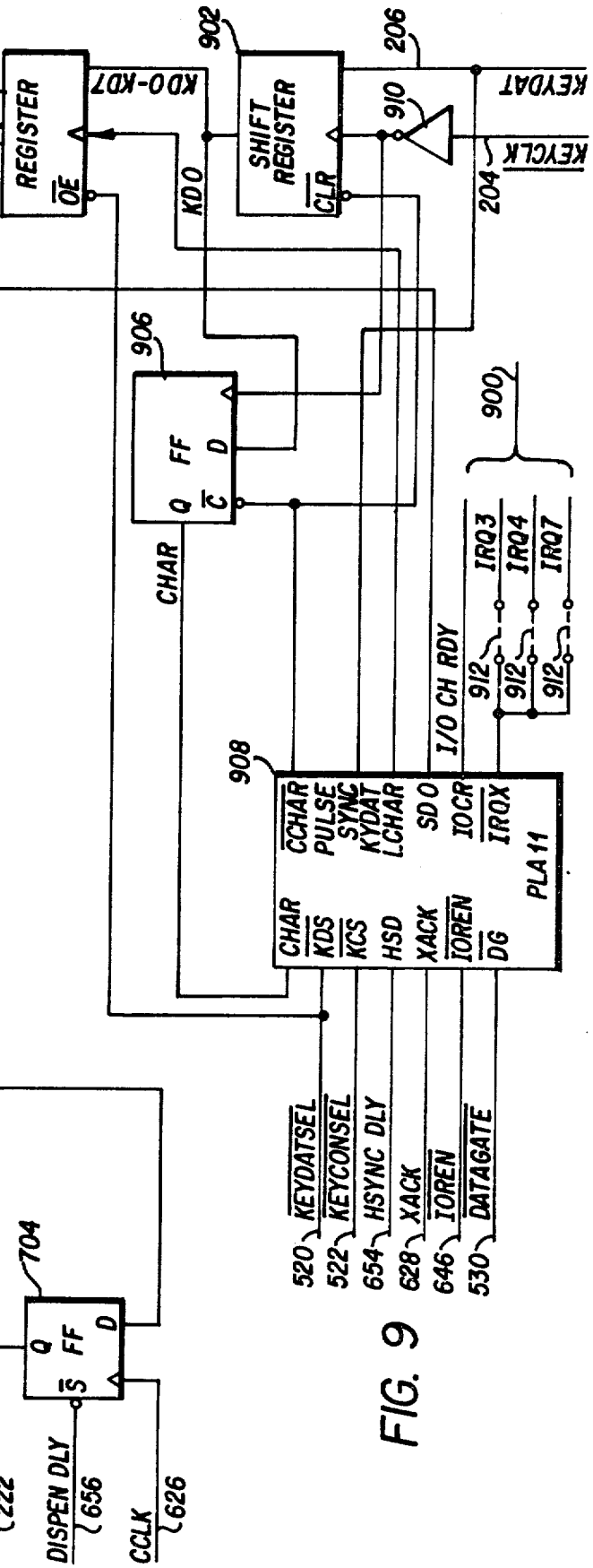
FIG. 7
FIG. 9

PERSONAL COMPUTER WITH MULTIPLE INDEPENDENT CRT DISPLAYS OF IDEOGRAPHIC AND/OR ASCII CHARACTERS HAVING LOADABLE FONT MEMORY FOR STORING DIGITAL REPRESENTATIONS OF SUBSET OR SPECIAL CHARACTERS

BACKGROUND OF THE INVENTION

The present invention relates to an improvement in personal computers which permits the use of a plurality of CRT displays each capable of displaying ASCII characters, ideographic characters such as those of the oriental languages, or a mix of ASCII and ideographic characters.

In recent years the personal computer has found widespread use in offices for performing various functions such as word processing. This use has created a need for multiple stations, each including a keyboard and a CRT display so that multiple operators may simultaneously use the word processing capabilities of the personal computer. This need has in part been satisfied by software. However, the software approach places a heavy burden on the personal computer. According to one feature of the present invention, display control cards are provided, each being insertable into a slot in the motherboard of the PC and each having connector means to which a keyboard and a display may be connected. When it is desired to add another station to a system, all that is required is that another display control card be inserted into an empty slot on the motherboard in the personal computer, and the keyboard and CRT display comprising the new station connected to the card.

Word processing in oriental languages presents certain problems because of the large number of characters in the languages. For example, the Chinese language comprises thousands of ideographic characters. One must know about 2,000 of these characters to be considered literate and one is considered well educated if he has a written vocabulary of 5,000 characters. In an effort to deal with the problem certain standard codes have been adopted for certain languages. For example, the de facto standard GB2312-80 code is widely used for the Chinese language. The GB2312 standard may be visualized as a matrix of rows and columns of characters. Each character of the font is assigned a 16-bit code wherein the first byte designates the column location and the second byte represents the row location of the character in the matrix With a 16-bit code it is possible to define $2^{16}$ or 65,536 characters. However, the standard assigns a specific 16-bit code to only about 7600 characters and the assigned code point values do not comprise a sequence of consecutive numbers In other words, the code set is loosely populated and certain locations in the matrix do not represent any character. Therefore, if the 16-bit code is used to directly address a ROM in order to read out the digital video representation of a character, as is conventionally done, an extremely large ROM is required, with less than one-eighth of the ROM being used to actually store the digital video representations of the characters. A similar situation exists with respect to the Japanese Interchange Standard (JIS) except that the locations in the matrix which do not represent any character are different. A feature of the present invention is the provision of a translator ROM which is addressed by a numeric value designating a particular character in a given code to produce an address value which falls within a range of consecutive numbers, the address value then being utilized to read from a font ROM the digital video signals which are applied to a CRT to display the character.

In oriental languages the characters representing names are frequently fanciful. Also, it is desirable to be able to provide a font of special characters which might be required in a specific system application. It is not feasible to provide ROM storage of the digital video representation of all such special or fanciful characters. Therefore, a further feature of this invention is the provision of a loadable font memory the contents of which may be changed by the user as he wishes to provide representations of special characters required for a specific job application.

SUMMARY OF THE INVENTION

An object of the present invention is to provide a plurality of display control cards, each insertable into the mother board of a personal computer, and each having connector means for attaching a keyboard and a display monitor whereby the personal computer may be converted from a single user, single task system to a multi-user, multi-task system.

An object of the present invention is to provide a display control card which may be inserted into the motherboard of a personal computer, the card having connectors thereon for attaching a video display and a keyboard thereto whereby an additional work station may be added to the system, without changing the programming of the computer, by adding only a display control card, a keyboard and a video display.

A further object of the invention is to provide a display control card as described above which is compatible with many personal computers and includes refresh and attribute control circuits thereon whereby the personal computer need only supply the data to be displayed.

Another object of the invention is to provide a display control card for controlling the visual display of ideographic characters, ASCII characters or a mixture of both ideographic and ASCII characters, the card having a font memory for storing the digital video representations of the more commonly used characters in a language and a loadable font memory for storing digital video representations of special characters.

Another object of the invention is to provide a display control card as described above and having a loadable font memory comprising a random access memory addressable from the computer for storing therein the digital video representations of special fanciful or "non-standard" characters. When a character memory on the card is loaded with a code representing a special character, the loadable font memory is addressed to read out to the video display the digital video representation of the character.

A further object of the invention is to provide a display control card including means for converting a set of non-consecutive numbers to a set of consecutive numbers, the consecutive numbers then being applied to a storage means to read therefrom the digital video representations of the characters represented by the non-sequential numbers.

A further object of the invention is to reduce the size of a font memory required to store the digital video representations of characters when the characters are represented by numeric values and the characters in a font are not represented by consecutive numeric values. The characters to be displayed are transferred from the computer to a character memory on a language display card The characters as loaded into the character memory are represented in the internal code of the computer. In this internal code, all possible code values do not represent a character. The output of the character memory is fed to a translator ROM which converts non-consecutive numeric code values of the internal code into consecutive code values. The output of the translator ROM is then used to address a font ROM which stores the digital video representations of all characters in the font. As a result, the font memory reads out to the video display the digital video representations of those characters stored in the character memory. Since the font memory is addressed by a numeric value which is in a set of consecutive numeric values there need be no empty storage locations in it.

A further object of the invention is to provide a display control card having a character memory for storing characters to be displayed on a video display, a plurality of memories for storing digital video representations of characters in different standard codes, and a control memory, the control memory and the memories storing the digital video representations being addressed in parallel by characters read from the character memory, the control memory being addressed by each character to read out control signals which determine the memory that is to apply a digital video representation to the video display.

Other objects of the invention and its mode of operation will become apparent upon consideration of the following description and the accompanying drawings.

BRIEF DESCRIPTION OF THE DRAWINGS

FIGS. 2-4 when arranged as shown in FIG. 2A, comprise a block diagram of a single display control card illustrating the major paths of data flow through the card;

FIGS. 5-8 are logic diagrams of the timing and control circuits of FIG. 2;

FIG. 9 shows details of the keyboard interface circuits; and,

DETAILED DESCRIPTION OF THE INVENTION

Multi-User PC System

Figure 1:
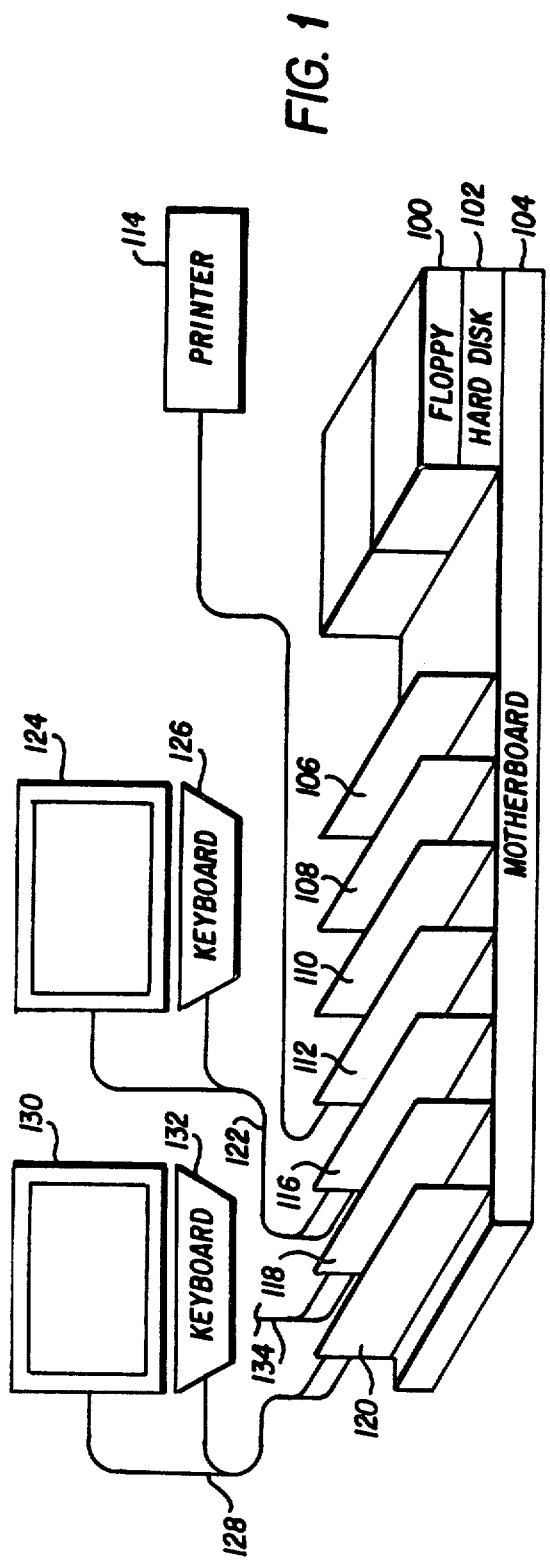
FIG. 1 is a perspective view of a typical personal computer, the figure also schematically illustrating the connection of a printer and work stations to the computer.

FIG. 1 illustrates a typical personal computer (PC) modified in accordance with the principles of the present invention. For the purpose of illustration only, it is assumed that the PC is a Model 40 or 50 PC marketed by the Sperry Corporation. The PC may include a floppy disk unit 100, a hard disk unit 102, and a motherboard 104 having seven slots for receiving seven circuit cards including a floppy disk adapter card 106, a hard disk adapter card 108, a mapper card 110 and a printer adapter card 112 for controlling a printer 114. The PC normally includes a monochrome display adapter card for controlling a single CRT display monitor but in accordance with the principles of the present invention the display adapter card is replaced with a Chinese Language Display Card 116. In addition, Chinese Language Display Cards 118 and 120 are inserted into otherwise vacant slots on the motherboard 104. Since the illustrated model has seven slots, up to three language display cards may be used.

The card 116 is provided with connector means (not shown in FIG. 1) for connecting the card by a cable means 122 to a monochrome display 124 and a keyboard 126. In like manner, card 120 is connected by cable means 128 to a display 130 and a keyboard 132. It will be understood that card 118 is connected by a cable means 134 to a third display and keyboard (not shown).

Because the described embodiment is specifically designed for the display of Chinese characters, the cards 116, 118 and 120 are referred to herein as Chinese Language Display Cards or CLDCs. However, as will be evident when the circuits on these cards are subsequently described, each card is capable of controlling the display of ideographic characters in any language, standard ASCII characters, or ideographic characters interspersed with ASCII characters.

A CLDC is directly interchangeable with the monchrome display board normally used in the PC. For this reason, and because the operation of the PC is documented in the prior art (see the Technical Reference Manual UP10136 for the Sperry PC) the operation of the PC is not further described herein. However, it should be noted that the mapper in the PC must be modified to handle 16-bit words rather than 8-bit words.

FIG. 1 illustrates one feature of the present invention, that feature being the ability to connect additional displays and keyboards to a PC merely by adding one CLDC for each display and its associated keyboard. This is made possible because each CLDC includes connector means for receiving the cable means extending to its associated display and keyboard. As will be evident from the following description, this enables a single task, single user PC to be converted to a multi-user, multi-task system.

CLDC - General Considerations

In the following description the first digit of a number represents the figure where an element is located or, in the case of an input signal, the figure where the source of the signal is located. As a further convention, a slash (/) before a signal nmemonic in this description corresponds to the logical Not, and in the drawings the logical Not is represented by a horizontal line over the nmemonic.

Figure 3:
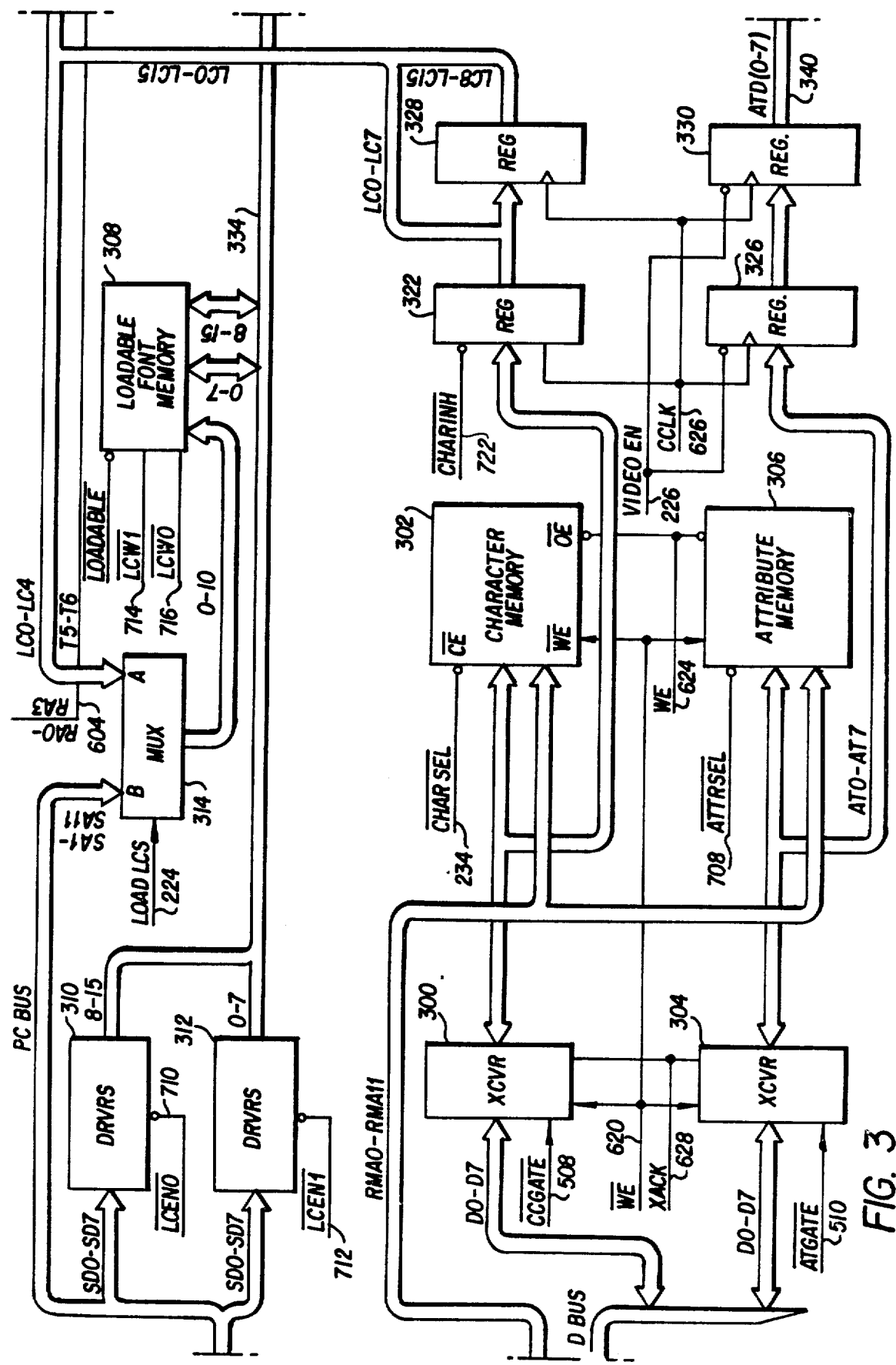
Figure 4:
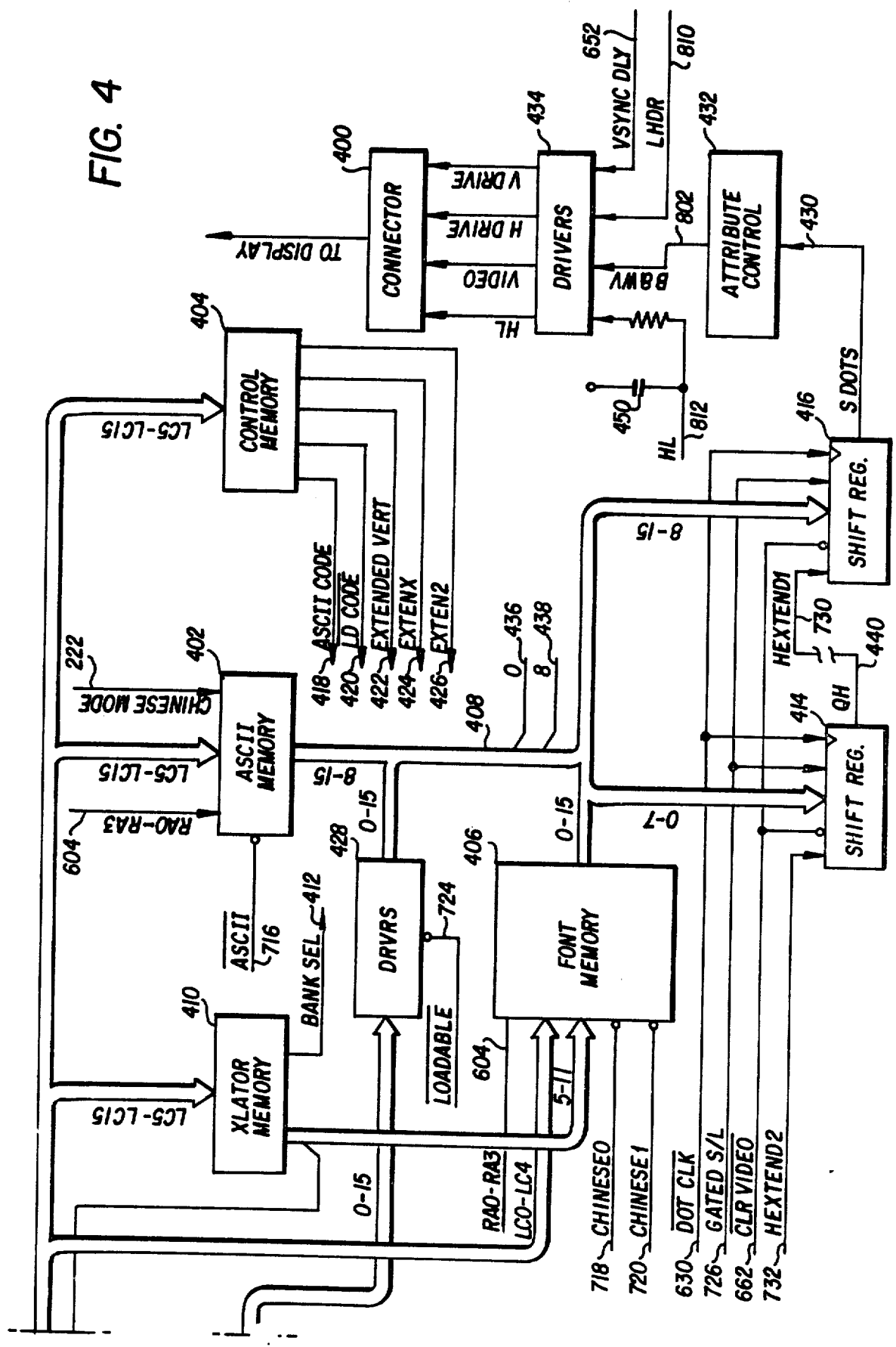

FIGS. 2-4, when arranged as shown in FIG. 2A, comprise a register level block diagram of a single CLDC illustrating the major paths of data flow. The CLDC includes a first connector 200, a second connector 202, and a third connector 400. The connector 200 is inserted into a slot in the motherboard 104 so that signals may pass over the connector between the PC and the CLDC. The connector 202 connects the CLDC to a keyboard so that data and clock signals on leads 204 and 206 may flow from the keyboard into the keyboard interface circuits 208 on the CLDC. The connector 400 connects the digital video output of the CLDC to one of the CRT displays.

The CLDC is fully compatible with, and may be substituted for, the monochrome display control card in the Sperry Corporation Model 40 or 50 PC or other PCs compatible with the Sperry PC. Through connector 200 the PC supplies a twenty-bit address but only the low order bits SA0–SA11 and the high order bits SA15–SA19 are used in the CLDC bits 12–14 being zeros. The PC also supplies 8-bit bytes of data SD0–SD7 as well as certain control signals including an Address Enable signal (AEN), a Reset Driver signal (R DVR), a System Memory Write signal (/SMEMW), a System Memory Read signal (/SMEMR), an Input Output Write signal (/IOW), and Input Output Read signal (/IOR) and an I/0 Clock signal (I/0 CLK). The AEN, data, address, clock and driver reset signals are active when high and the remaining signals are active when low. Upon passing through connector 200 these signals are applied over a PC bus 210 on the CLDC to the various CLDC circuits.

The Keyboard Interface circuits 208 apply keyboard data to the PC by way of the data lines SD0–SD7 and connector 200. In addition, the Keyboard Interface circuits 208 also generate three interrupt request priority signals IRQ3, IRQ4 and IRQ7 which are applied to the PC via leads 900, the PC bus and connector 200.

Since the nature of each of the signals passing through connector 200 is well documented in the prior art, the timing and nature of the signals will not be described. Most of the control signals entering the CLDC through connector 200, as well as the addressing signals, are applied over the PC bus to the timing and control circuits 212 which control the sequencing of the CLDC circuits In addition, the addressing signals SA0–SA3 and the control signals RDVR, /SMEMR, /IOW and /IOR are applied to a set of drivers 214 having their outputs connected to control circuits 212.

The timing and control circuits 212 are illustrated in FIGS. 5–8 and comprise ten programmable logic arrays (PLAs) 500, 502, 504, 602, 604, 606, 700, 702, 800 and 804, a type MC68B45P video controller 600, and a 16.257 MHZ oscillator 632.

PLAs 504, 602, 604 and 605 are registered AND-OR arrays. That is, they include flip-flops for registering or storing the signals resulting from a logical combination of input signals, the outputs from the flip-flops being the outputs of the PLAs. The remaining PLAs are AND-OR arrays without registers so that the output signals produced by these arrays are always the result of the logical combinations of signals applied thereto. In FIGS. 5–8, the input and output pins of each PLA are given an identification which is shown within the block representing the PLA. Appended hereto are the sets of logic equations defining the operations of each PLA. In these equations the conditions on the right side of an equation must be true at the input pins of the PLA in order for the condition on the left side of the equation to be true at the output pin. The logic equations for registered PLAs 504, 602, 604 and 605 do not include the clocking signal which is required to clock the flip-flops in these PLAs. It should be understood that in the equations for these PLAs the output signals change state only upon occurrence of the clocking signal.

In the appended logic equations the IF statements in certain equations are used where a tristate signal is involved. In these equations the output is produced only when the IF condition is met. A high impedance output rather than the complement output signal is produced when the IF condition is not present. In all equations the asterisk (*) represents the logical AND, the plus (+) represents the logical OR, and the slash (/) represents the logical NOT.

When the PC is turned on, it generates the signal RDVR which resets all CLDCs. RDVR passes from the PC bus 218 through one driver of a set of drivers 214. The driver produces the signal RST on lead 236 which is connected to the circuits in the CLDC to reset all counters, flip-flops and registers. The signal RST is also passed through an inverter 640 to generate /RST which is also used to initialize the CLDC circuits.

When power is turned on in the PC, its power supply provides the power for the CLDC circuits through connections which are not shown. The oscillator 632 begins producing the signal Dot Clock on lead 636 and, through an inverter 634, the signal /Dot Clock on lead 630. The output of the oscillator is connected to the clocking input of PLA 604. The PLA is burned in to function as a nine phase counter producing the signals C0–C3 in the sequence shown in FIG. 10. One cycle of this counter is defined as a character cycle. PLA 604 also repeatedly produces the signals /Q5 and /SL and, if the signals XCLK and /SMEMW on leads 640 and 210 are high, the signal WE. The signal /SMEMW is generated by the PC and placed on PC bus 210 only during the writing of data into the PC memory and for purposes of the present invention it may be assumed that this signal is high.

The C0–C3 outputs of PLA 604 are applied to PLA 606 which produces the signal CCLK on lead 626 and its complement /CCLK on lead 627 once during each cycle of the counter. /CCLK is the character clock signal which is applied to the video controller 600 to increment the character address produced on bus 602 during refreshing of the display. The address is applied to a character memory as subsequently described to cause the characters in the memory to be displayed on a CRT. However, before the video controller 600 may control the display of characters the controller must be programmed to generate the desired sequence of signals. The loading of the controller is done in a conventional manner and the circuits for accomplishing this are not described herein although they are shown. However, it should be noted that the video controller is programmed to generate a sequence of dot row addressing signals RA0–RA4 and a sequence of character addressing signals MA0–MA11. The controller generates 80 successive character addresses on leads 602 after which it increments the dot row address RA0–RA3 and repeats the 80 successive character addresses. When the dot row addressing reaches a count of 19 it restarts at zero and the addressing signals MA0–MA11 address another sequence of 80 characters. Upon reaching an address count of 2K the controller produces the End of Screen (EOS) signal on lead 650 and restarts the entire sequence. Thus, the controller controls the display of up to 25 rows of characters on the CRT with up to eighty characters per row.

The dot row addressing signals RA0–RA3 are applied to the A inputs of MUX 670 and pass through the MUX to become the signals RA0–RA3 on leads 604. Output RA4 of the controller 600 is connected to the select input of MUX 670. The dot row addresses pass through MUX 670 until the address RA0–RA4 reaches 15. At that time RA4 selects port B of the MUX so that the signals on leads 604 are all ones while the count of addressing signals RA0–RA4 produced by the controller is from 16 to 19. The reason for this is that the CLDC controls the display of Chinese characters in a double cell 18 dots wide by 19 dots high. The Chinese character within these cells are displayed in a matrix of dot positions comprising 16 horizontal rows 16 dots high. The MUX 670 output defines the horizontal row of dots to be displayed on one line scan of the CRT and the B inputs of the MUX are selected to vertically extend a character as subsequently described.

Controller 600 also produces the vertical and horizontal sync, display enable and cursor control signals. These signals are all applied to PLA 602 which is clocked by CCLK from PLA 606. PLA 602 produces the VSYNC DLY, HSYNC DLY, DISPEN DLY, CURSOR DLY, /Dl and /CLR VIDEO signals VSYNC DLY is applied over lead 652 and through one of drivers 434 to the CRT to provide the vertical sync for the CRT. HSYNC DLY is applied to PLA 804 to produce the signal LHDR on lead 810 when the CLDC is in the video enable mode so that flip-flop 806 is set. The signal LHDR is applied to a second of drivers 434 and the output of this driver is applied to the CRT as the horizontal drive for the display The DISPEN DLY signal is applied to a register 820 having its output connected to PLA 800 and a flip-flop 818. When DISPEN DLY is true, register 820 produces a signal to enable video signals destined for the CRT to appear on lead 802. When DISPEN DLY is false, the output of register 820 blocks the video signals from passing through PLA 800, and also sets the flip-flop 818.

Selecting A CLDC

A CLDC may not transmit data to, nor receive data from the PC unless it has been selected. On power-up, the program in the PC causes it to generate the signal Reset Driver as previously described to reset the circuits in all CLDCs. The program then automatically selects the CLDC having address 0. As long as any CLDC is selected none of the other CLDCs may respond to data or addresses placed on its PC Bus by the PC.

In order to select a CLDC, the PC applies to connector 200 an address in the range 20X (hexidecimal) while making the condition IOW true (/IOW) and the condition AEN false (/AEN). From connector 200 the signal /IOW and address signals SA0-SA3 pass through drivers 214 and are applied to timing and control circuits 212 as the signals /IOW and A0X-A3X Addressing signals SA4-SA9 pass from connector 200 over PC bus 210 directly to the circuits 212.

Figure 5:
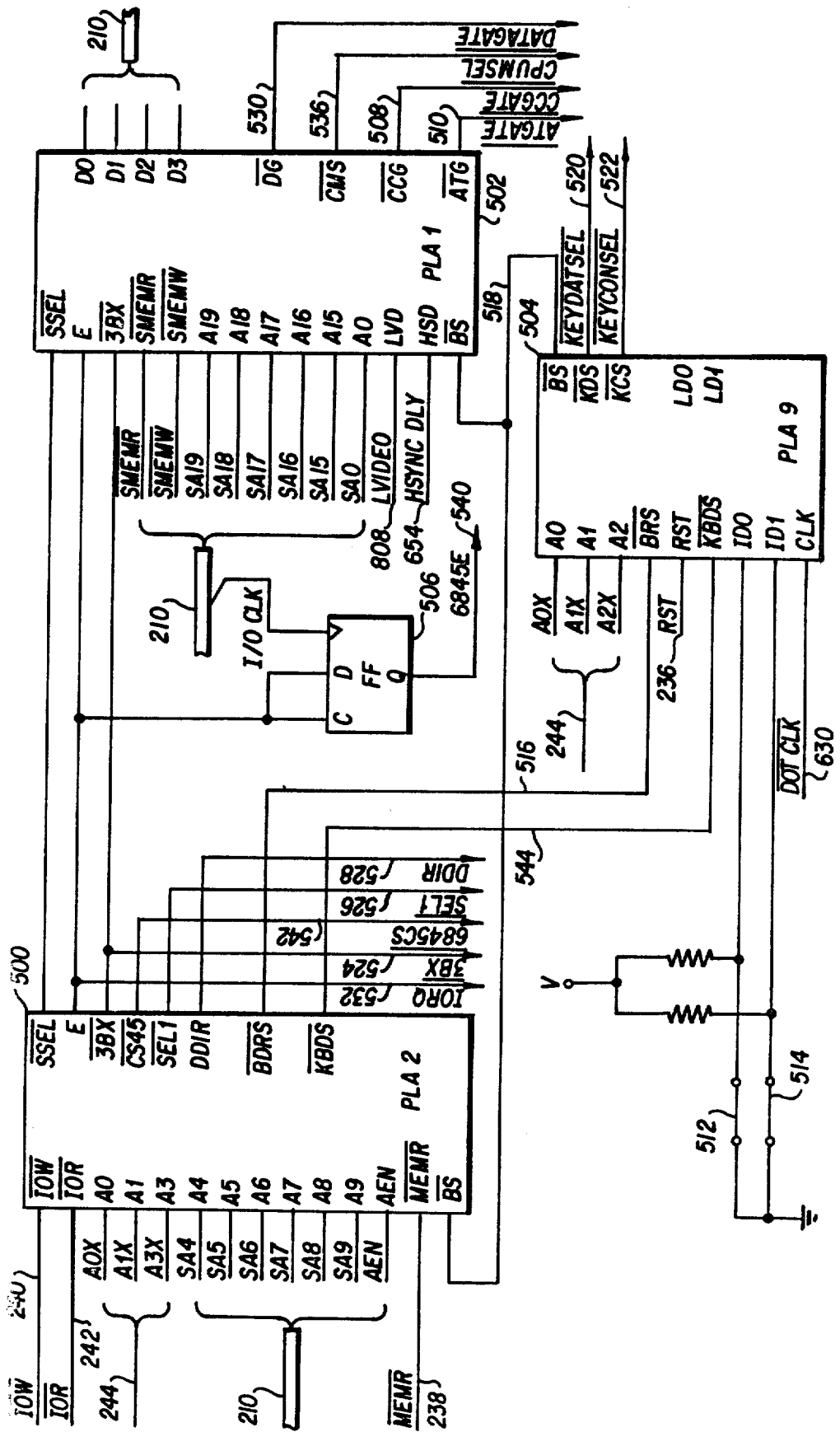
Figure 6:
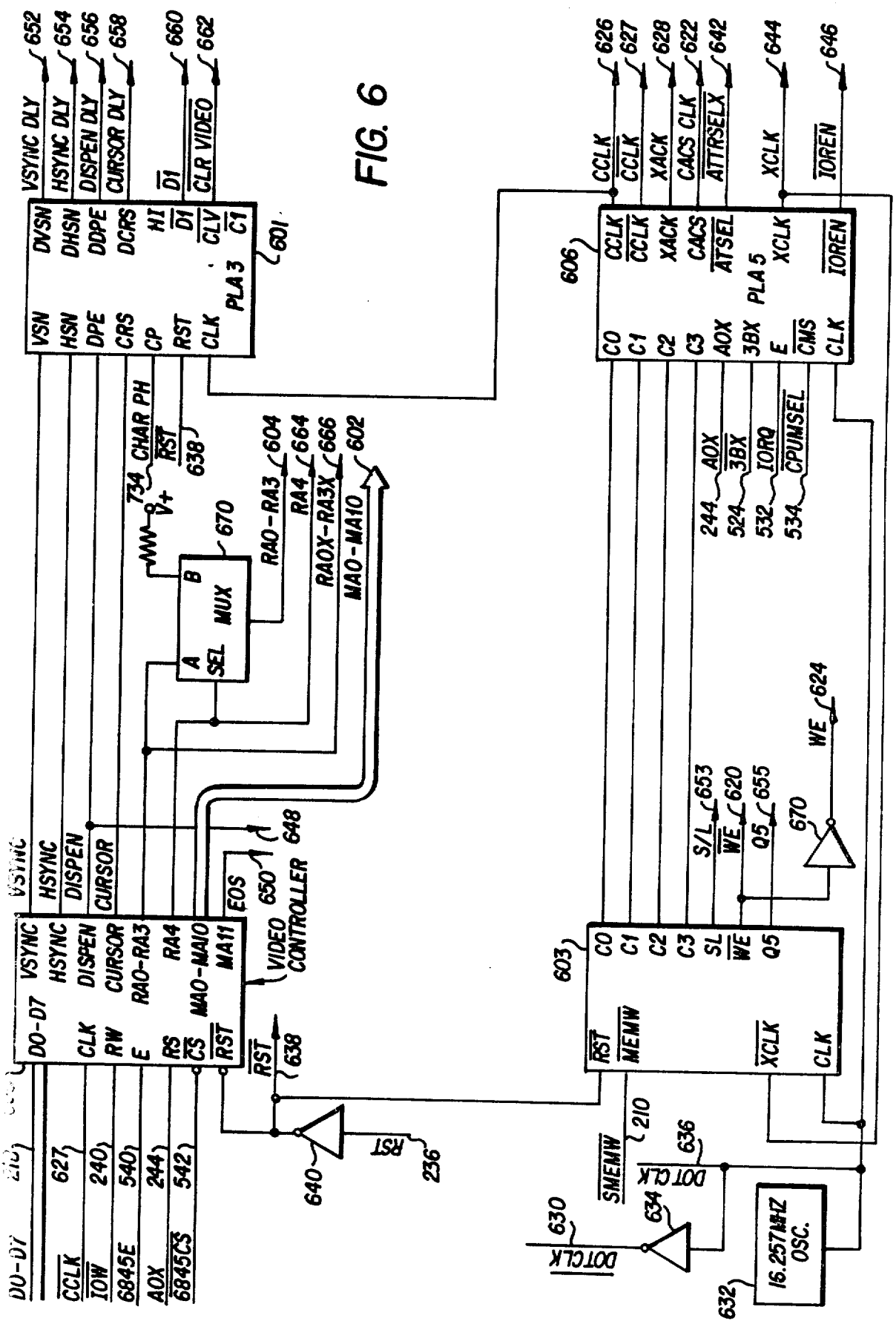

FIG. 5 shows that portion of the circuits 212 that control the addressing or selection of the CLDC. The selection circuits include the three PLAs 500, 502 and 504, and a flip-flop 506. In addition, provision is made for jumpering two inputs of PLA 504 to ground. The jumpers 512 and 514 determine the address of a CLDC. If both jumpers are present the address is 0 and if both jumpers are absent so that V+ is applied to inputs ID0 and ID1 of PLA 5, the address is 3. If jumper 514 only is present then the CLDC address is 1 and if jumper 512 only is present the address is 2. Since two jumpers provide for four addresses, a fourth CLDC might be added to the system of FIG. 1 if an additional slot is available.

The address signals SA4-SA9 and the control signal AEN are applied from the PC bus to inputs of PLA 500. The PLA also receives the control signals IOW and /MEMR and the address signals A0X, A1X and A3X from drivers 214. If the PC places an address 20X on the PC bus, and makes the signals AEN and /IOW on the PC bus low, PLA 500 produces the low level signal /Board Register Select on lead 516 if X is less than eight, i.e. SA3=0. The low level signal /Board Register Select indicates that the Board Register Select condition is true and is applied to one input of PLA 504.

If address bit A0X is a 0 the condition Board Register Select causes PLA 504 to generate internally the signal LD0 since /RST is high except during a reset operation. The signal /Dot Clock on lead 630 clocks a flip-flop which is set in the PLA to generate the signal LD0. In like manner, address bit A1X causes the PLA 504 to set a flip-flop which internally generates the signal LD1. On the next /Dot Clock signal the PLA compares LD0 and LD1 with the board address signals ID0 and ID1 determined by the jumpering 512 and 514. If the two addresses are equal then PLA 504 sets a flip-flop to generate the low level signal /Board Select indicating the board select condition is true. This signal is applied over lead 518 to one input of PLAs 500 and 502.

The CLDC remains selected even after the conditions for generating the signal /Board Register Select are no longer true The signal /Board Register Select rises to the high level and, with LD0 and LD1, causes the flip-flops producing LD0 and LD1 to remain set at each Dot Clock signal so that the board select signal on lead 518 remains true. During the interval one CLDC is selected, the other CLDCs are unable to respond to data on the PC Bus.

Setting the Operating Mode

After a CLDC has been selected, its mode of operation may be set by loading a 4-stage register 220. The PC sends to the CLDC an address 3BA together with the desired mode signals on leads SD0-SD7 and the control signals /IOW and /SMEMR. The signals SD0-SD7 are applied to a set of transceivers 216.

The addressing signals cause the PLA 500 to generate a low level signal /3BX on lead 524 indicating that the 3BX condition is true. The signal /3BX is applied to PLA 502 and PLA 606 over lead 524. Since the conditions for 3BX and IOW are true, the PLA 500 also produces the low level signal Select 1 on lead 526. /SMEMR causes one of drivers 214 to produce the signal /MEMR on lead 238 and since this indicates that the memory read condition is true the PLA produces the high level signal DDIR on lead 528. The DDIR signal is applied to transceivers 216 to select the data flow direction so that the data signals SD0-SD7 may be gated through the transceivers 216 to a D Bus 218.

The data is gated through transceivers 216 to the D Bus when the signal /DATAGATE on lead 530 is low. This signal is produced by PLA 502 because the board select, 3BX and enable (E) conditions are all true.

Bits 1, 3, 5 and 7 of the D Bus are connected to stages in the register 200. The Select 1 signal on lead 526 gates these bits into the register. Bit D1 is the Chinese mode control bit. The Chinese mode is selected when this bit is a zero so that the signal CHINESE MODE on lead 222 is high. The CLDC must be in the Chinese mode in order to control the display of Chinese characters or Chinese characters intermixed with ASCII characters. When the signal on lead 222 is low, the CLDC may control the display of ASCII characters only.

The Load LCS mode is selected when bit D3=0 so that the signal LOAD LCS on lead 224 is high. The CLDC must be in this mode in order to load special characters into a loadable font memory as subsequently described.

The Video Enable mode is selected when bit D5=1 so that the signal VIDEO EN on lead 226 is high. This signal clocks and sets a flip-flop 806 whose output controls the gating of horizontal sync pulses to the CRT display. When the signal VIDEO EN is low it clears two registers 326 and 330 through which character attribute signals are transferred as subsequently described.

The Blink Enable mode is selected when bit D7=1 so that the signal BLEN on lead 228 is low. This signal is applied to PLA 800 and enables the blinking of a character on the CRT display if the attributes for the character specify blinking.

Loading the Character and Attribute Memories

After the CLDC has been selected and the mode register 220 loaded, the PC may send to a character memory 302 the characters which are to be displayed on the CRT. At the same time, an attribute memory 304 is loaded with data indicating the attributes, i.e. blink, reverse video, underline, highlight, etc. for the characters loaded into character memory 302.

The PC sends data to the character and attribute memories by placing the data on the PC Bus while placing an address in the range B0000 to B0FFF on the PC Bus. The PC also places signals /SMEMR and /IOW on the PC bus. The address bits SA19-SA15 cause the PLA 504 to produce the low level signal /CPUMSEL on lead 534 because the condition SMEMR is true. PLA 504 also generates /DATA-GATE on lead 530 while PLA 500 generates DDIR on lead 528. These signals gate the data character through transceivers 216 onto the D Bus and they are applied through a set of latch transceivers 300 to the character memory 302 or through another set of latch transceivers 304 to attribute memory 304. The character memory 302 is provided for storing all of the characters to be displayed on the CRT screen at any given moment. It comprises two 16K RAM chips for storing up to 2,000 8-bit ASCII character codes or 1,000 16-bit Chinese character codes, assuming of course that the GB2312 character code set is used. Since the system is capable of displaying a screen of data comprising intermixed ASCII and Chinese characters, the maximum number of character codes contained in the memory at any given time may vary. As seen by the PC, the locations in the character memory comprise the even addresses between B0000 and B0FFF.

The attribute memory 306 is like the character memory but stores codes representing the attributes of the characters stored at the corresponding locations in the character memory. As seen by the PC, the locations in this memory have the odd addresses in the range B0000 to B0FFF.

A character on the D Bus is gated into transceivers 300 when the signal /CCGATE is high. When an address in the range B0000 to B0FFF is applied to the PC Bus, bits SA19-SA15 are applied to PLA 502. The PLA 502 drives the pin CMS high. The high level signal /CPUMSEL thus produced on lead 534 is applied to PLA 702 and PLA 606.

If the address is in the range B0000 and B0FFF and is even (SA0=0) the PLA 502 drives the output pin CCG high. The high level signal /CCGATE thus produced on lead 508 enables transceivers 300 so that the character byte on the D Bus may be latched into character memory 302. On the other hand, if the address is in the range B0000 and B0FFF and is odd (SA0=1) the PLA 502 generates the high level signal ATGATE on lead 510 to latch an attribute byte on the D Bus into transceivers 300.

The signal XACK on lead 628 is generated by PLA 606 and serves as a clocking signal to time the latching of data into transceivers 300 and 304. In addition, the transceivers receive the signal /WE on lead 628 and this signal controls the direction of data flow through the transceivers.

A MUX 230 is provided for addressing the character and attribute memories. When the memories are being loaded from the PC, the signal CACS CLK on lead 622 enables the MUX so that address bits SA1-SA11 on the PC Bus are passed through the MUX to the RAM address bus 232. The signal /CSELX is also gated through the MUX to become the signal /CHAR SEL on lead 234. /CSELX is produced by PLA 702 and is at the low level when the address on the PC Bus is even (SA0=0). The signal /CHAR SEL acts as a chip enable for character memory 302. The signal /ATTRSEL on lead 708 acts as a chip enable signal for the attribute memory and this signal is produced by PLA 702 when the address on the PC Bus is odd (SA0=1). The address signal A0X is applied to PLA 606 which generates the high level signal /ATTRSELX on lead 642. /ATTRSELX is applied to PLA which then generates /ATTRSEL to enable the memory 306.

In order to write data into the character and attribute memories the write enable signal /WE, produced by PLA 604, on lead 620, must be low. This signal enables the writing of data into the memories and also acts as a direction control signal for transceivers 300 and 304 so that data on the D Bus may pass through the transceivers to the memories.

Loadable Font Memory

In accordance with a second novel feature of the invention the CLDC is provided with a loadable font memory 308 comprising two 2K × 8 RAMs for storing the digital video representations of up to 128 special characters. This memory is provided so that the CLDC may control the display of a limited number of special Chinese characters. These characters may be names, technical terms, or other special characters not found in the GB2312 or other standard code being employed and which might be required for a specific application.

The loadable font memory is loaded from the PC with the digital video representation of the special characters. To digress for a moment, it should be understood that the CRT driven by the CLDC employs a conventional TV raster scan and is capable of displaying 25 horizontal rows of characters with each row having 80 character spaces. A Chinese character occupies two character spaces on the display while ASCII characters occupy only one space. Each character is displayed by illuminating on the CRT certain dot positions within a matrix of dot positions. The character matrix for an ASCII character varies depending upon whether or not the CLDC is operating in the Chinese mode. When the CLDC is operating in the Chinese mode an ASCII character matrix is eight dots wide and sixteen dots high and is displayed in a cell 9 dot rows wide and 19 dots high. When not operating in the Chinese mode ASCII characters are displayed in a matrix seven dots wide and nine dots high and the characters are displayed in a cell 14 dot rows high and 9 dots wide. The matrix for a Chinese character is sixteen dots high and sixteen dots wide and these characters are displayed in a cell 19 dot rows high and 18 dots wide. A row of characters is displayed by sending to the CRT a sequence of signals to illuminate the desired dot positions in the top dot row for the first, second . . . nth characters, then a sequence of signals to illuminate the desired dot positions in the second dot row for each character, and so forth until all dot rows for that row of character have been selectively illuminated. Sequences of signals are then sent to the CRT to illuminate the second, third, . . . twenty-fifth rows of characters after which the CRT beam is deflected back to the first row to repeat the process thereby refreshing the display Reference may be had to Cole et al. Pat. No. 3,345,458 for a further description of a system of this general type wherein all characters are displayed in the same size matrix.

The signals sent to the display to cause the display of one character are referred to as the digital video representation of the character. Thus, for each special Chinese character the loadable font memory is loaded with sixteen 16-bit values, each 16-bit pattern comprising binary ones and zeros corresponding to the dot positions on one line of the character matrix which are to be illuminated or not illuminated.

The digital video representation of a character is loaded into memory 308 one byte at a time and may be loaded therein only when the mode register 220 is set so that the signals LOAD LCS and Chinese Mode are true. From the connector 200 a byte of data passes over the PC bus to two sets of drivers 310 and 312. /LCEN 0 gates data through drivers 310 if address bit SA0=0 and /LCEN1 gates data through drivers 312 when address bit SA0=1. Depending upon whether the byte of data passes through drivers 312 or 310, it is applied to the low order or high order byte data inputs of memory 308. The signals /LCW0 and /LCW1 are write enable signals for enabling the writing of the byte of data into the memory. These signals are also generated by PLA 702 and are conditioned by the low order address bit SA0 to enable writing of the data into the low order byte of an address if the data comes from drivers 312, or into the high order byte of an address if the data comes from the drivers 310.

The address for selecting the location in memory 308 which is to store data passes from connector 200, over the PC Bus and through a MUX 314 to the address inputs of the memory. The B port of the MUX is selected by the mode signal LOAD LCS on lead 224. As seen by the PC, the locations in memory 308 have the same range of addresses as the character and attribute memories 302 and 306. The signal LOAD LCS must be present for PLA 702 to generate /LCEN0, /LCEN1, /LCW0 and /LCW1 required to write into the loadable memory 308. On the other hand, when LOAD LCS is present it prevents PLA 702 from generating the signals /ATTRSEL and /CSELX thereby preventing any data from being written into the character and attribute memories 302 and 306. The PC provides a sequence of addresses for addressing the loadable font memory 308 and with each address provides data on lines SD0-SD7, each byte of data being one-half of the digital video representation of one dot row of the special character. After the memory 308 is loaded or changed as desired, register 220 must be addressed while a data byte having bit 3=1 is placed on the PC Bus to set one stage of register 220 and terminate the signal LOAD LCS. This will then permit the PC to transmit further data to character and attribute memories.

ASCII Memory

The CLDC also includes an ASCII memory 402 which comprises an 8K×8 EPROM chip burned in to store the digital video representations of ASCII characters. Actually, memory 402 stores two digital video representations of each ASCII character. The reason for this is that when the CLDC is operating in the Chinese mode (bit 1 of register 220 reset) it may control the display of ASCII characters intermixed with Chinese characters and in this case the character is displayed within a matrix of sixteen horizontal rows each containing eight dot positions. On the other hand, when the CLDC is not operating in the Chinese mode (bit 1 of register 220 is set) the CLDC controls the display of ASCII characters only and in this case each character is displayed within a matrix of nine horizontal rows each containing eight dot positions. The signal Chinese Mode on lead 222 serves as an additional address bit to select one of the two possible digital video representations. The signal ASCII on lead 716 serves as a chip enable and output enable for the memory 402. When this signal is low it enables the memory to read out the digital video representation stored at the addressed location. Addressing of the memory is described below.

Font Memory

A font memory 406 is provided for storing the digital video representations of up to 8K Chinese characters. If the GB2312-80 code is used, this memory stores the digital video representations of the approximately 7600 Chinese and other characters defined by this code. The font memory comprises four 64K×8 EPROM chips having their outputs connected to the font bus 408. The outputs of two of the chips are enabled by the signal /CHINESE 0 on lead 718 and the outputs of the other two chips are enabled by the signal /CHINESE 1 on lead 720. These signals are produced by PLA 700 and are the function of a Bank Select signal produced by a translator 410 on a lead 412 as subsequently described.

Displaying Characters on the CRT

In order to display on the CRT the characters stored in character memory 302, the memory is repeatedly addressed and the characters read out to address the loadable font memory 308, the ASCII memory 402 and the font memory 406. Briefly each character, after translation by translator 410, addresses one of the memories 308, 402 or 406 to read therefrom the digital video representation of that character required to illuminate one horizontal row of dots for that character on the CRT. This digital video representation is placed on font bus 408, parallel loaded into two 8-bit shift registers 414 and 416 and then serially shifted out of register 416 to provide the video signal for driving the CRT. The character memory must be repeatedly read out in order to "refresh" the CRT so that the rows of characters appear solidly on the CRT.

The repeated reading out of the character memory 302 is controlled by the video controller 600 in a well-known manner. The controller produces 11-bit sequential addresses on a bus 602. The addresses are applied to MUX 230 and pass through the MUX to become the signals RMA0-RMA10 on bus 232. The signal WE produced by PLA 604 is inverted by inverter 670 and applied over lead 624 to enable the outputs of both the character memory 302 and the attribute memory 306. Each time an address is applied to bus 232, a single byte is read from the character memory 302 and applied over a bus 320 to a register 322. At the same time, one byte is read from attribute memory 306 and applied over a bus 324 to a register 326.

Register 322 has its outputs connected to a further register 328 while register 326 has its outputs connected to a further register 330. All registers are clocked by the signal CCLK generated by PLA 606 on lead 626. The register 322 is cleared when the signal /CHARINH, produced by PLA 702 in response to controller 600, is low, while the registers 326 and 328 are cleared when the signal Video Enable, derived from mode register 220 is low.

As each byte is read from character memory 302 it is clocked into register 302 as its attributes are read from the attribute memory 306 and clocked into register 326. At the same time, the preceding byte is clocked into register 328 while attribute for the preceding byte is clocked into register 330.

The outputs of registers 322 and 328 are connected to the low order byte and high order byte positions, respectively of a 16-bit LC bus 332. Bit positions LC0-LC4 of this bus are applied to the A input port of MUX 314 and to the addressing inputs of font memory 406. Bit positions LC5-LC15 are connected to the addressing inputs of the ASCII memory 402, the control memory 404 and the translator 410.

The translator is provided in order to permit the use of a smaller font memory than would otherwise be required. The Chinese GB2312-80 defines about 7600 legal characters. However, as previously noted, each character is defined by sixteen bits. Therefore, if the conventional technique of converting the character code to a digital video representation were used, the font memory would require $2^{16}$ character addresses (actually $2^{16} \times 8$ addressable locations) for storing the digital video representations, and the character codes would be applied to the font memory as character addresses. Most of the font memory locations would be unused because there would be no legal character codes corresponding to them.

The translator 410 serves to convert the 16-bit Chinese character codes read from character memory 302 and placed on the LC bus into 13-bit sequential addresses. That is, the GB2312-80 code, wherein the code point values are not a consecutive numerical sequence, is converted into a 13-bit code wherein the code point values are consecutive numbers. This permits the use of a font memory 406 having only $2^{13}$ character addresses (actually $2^{13} \times 8$ addressable locations). Thus, font memory 406 need be only one-eighth as large when the translator is provided.

The translator 410 is a $2K \times 8$ EPROM chip burned in to provide the desired address translation. The translator responds to bits LC5-LC15 to produce output signals T5-T11 and the Bank Select signal 412 which controls the font memory bank select signals /CHINESE 0 and /CHINESE 1 on leads 718 and 720. Output bits T5-11 are applied to the font memory 406 as the high order character address signals. In addition, output bits T5 and T6 are applied to MUX 314 as the high order character address bits for addressing the loadable font memory 308.

As previously noted, the font memory 406, the ASCII memory 402 and the loadable font memory 308 all store the digital video representations of characters. This means that for each Chinese character which addresses one of these memories the memory must be storing 16 representations, one for each horizontal line of dots which comprises the displayed character. The character address is placed on the LC bus from the character memory 302 and the video controller 600 generates addressing signals RA0-RA3 on leads 604 to select one of the 16 digital video representations for tha character address. Leads 604 are connected to MUX 314, and the addressing inputs of ASCII memory 402 and font memory 406.

Since the character placed on the LC bus is applied to all three memories 308, 402 or 406, a control must be provided to insure that only one of the memories is read out to the font bus. That is one purpose of control memory 404. This memory is a $2K \times 8$ EPROM burned in to selectively provide the control signals ASCII CODE, LD CODE, EXTENDED VERT, EXTENX AND EXTEN2. The signals produced by memory 404 are determined by the value of the character code applied to the memory as an address. Fortunately, the code values for the ASCII characters do not fall in the range of the code values for the Chinese characters of the GB2312-80 standard. Furthermore, the code values assigned to the special or loadable Chinese characters are chosen so that they do not duplicate the code values of any ASCII or GB2312-80 standard character. Thus, the value of a character code inherently indicates whether it is a Chinese, ASCII or special character.

The memory 404 is burned so that it produces the high level signal ASCII CODE and the low level signal /LD CODE when an ASCII character code is applied to the memory over the LC Bus. ASCII CODE is applied to a PLA 700 which produces the low signal /ASCII on lead 716 to enable the output of the ASCII memory. The signal CHINESE MODE is applied to the ASCII memory as the high order of the address, and in conjunction with the character on the LC Bus, comprises the character address of the digital video representation of the character. If the signal CHINESE MODE is high (Not Chinese Mode) then the character address is such that the digital video representation read from the memory comprises nine 8-bit representations, one eight bit representation for each horizontal row of dots in a normal ASCII character display. On the other hand, if the signal CHINESE MODE is low then the character address is such that the digital video representation read from the memory comprises sixteen 8-bit representations, one 8-bit representation for each horizontal row of dots in an ASCII character when displayed in the Chinese mode.

When the ASCII memory is read out, it is necessary to inhibit the readout of the loadable font memory 308 and the font memory 306. The high signal ASCII CODE on lead 418 causes PLA 700 to drive the signals /CHINESE 0 and /CHINESE 1 on leads 718 and 720 high. These signals disable the output of the font memory 406. The low signal /LD CODE on lead 420 is applied to PLA 702 which then produces the high level signal /LOADABLE on lead 724. /LOADABLE is applied to the output enable pin of the loadable font memory 308 to prevent any output from the memory. /LOADABLE also blocks a set of drivers 428 to prevent any signals on bus 334 from reaching the font bus 408.

In the case where the character code on the LC Bus is a special character having its digital video representation stored in the memory 308, control memory 404 reads out a low level signal on lead 418 and a high level signal on lead 420. In FIG. 7, the high signal /LD CODE causes PLA 702 to drive the signal /LOADABLE on 724 to the low level. In FIG. 3 /LOADABLE enables the output from the loadable font memory 308 and in FIG. 4 it enables drivers 428 to pass the output of the memory onto the font bus 408. In FIG. 7, the low level signal /LOADABLE causes PLA 700 to drive the signals /CHINESE 0 and /CHINESE 1 high thereby disabling the output of the font memory 406. The low level signal ASCII CODE on lead 418 causes PLA 700 to output the high level signal /ASCII on lead 716 to disable the output of ASCII memory 402.

In the case where the character code on the LC Bus is a standard Chinese character having its digital video representation stored in the font memory 406, control memory 404 outputs low level signals on leads 418 and 420. The low level signal /LD CODE on lead 420 causes PLA 702 to produce the high level signal /LOADABLE on lead 724. This signal blocks the output of loadable font memory 308 and also blocks drivers 428. The signals /LOADABLE and ASCII CODE are both applied to PLA 700. Since the signal ASCII CODE is low, PLA 700 produces the high level signal /ASCII on lead 716 to disable the output of ASCII memory 402. Since ASCII CODE and /LOADABLE are both low, PLA 700 selectively produces one of the signals /CHINESE 0 and /CHINESE 1 on leads 718 and 720 depending upon whether the Bank Select signal produced by translator 410 on lead 412 is low or high, respectively.

To display the digital video representations read onto font bus 408 from the loadable font memory 308, the ASCII memory 402 or the font memory 406, the representations are loaded in parallel into the two shift registers 414 and 416. When the font or loadable memory is read out bits 8-15 are loaded into shift register 414 and bits 0-7 are loaded into shift register 416 when the signal GATED S/L on lead 726 goes low. When the ASCII memory is read out the bits are loaded into shift register 416 while zeros are loaded into register 414. The signal on lead 726 then goes high so that the registers may be repeatedly shifted. The parallel loading and the shifting of the shift registers is clocked by the signal /DOT CLOCK on lead 630. As the registers are shifted, the highest order bit in register 416 is read out over lead 430 to an attribute and display control 432 while the high order bit in register 414 is shifted into the low order bit position of register 416.

The attribute and display controls are actually that portion of control circuits 212 shown in FIG. 8 which control the attributes of a character such as underlining, reverse video and highlighting.

Assuming a normal display, the video signals shifted out of the high order of shift register 416 pass over lead 430 to PLA 800 and emerge on lead 802. From lead 802 the video signals are serially applied through a driver in a set of drivers 434 to the connector 400 from whence they are applied to the CRT. At the same time, the video signals shifted out of register 414 pass over lead 440 and are applied to PLA 700. Assuming no horizontal or vertical character extension, the output signal HEXTEND1 from PLA 700 follows the level of the output signal from register 414 and is applied over lead 730 to the low order stage of register 416.

If the video representation of a character read from the loadable font memory 308 or the font memory 406 is loaded into the shift registers 414 and 416, it takes sixteen DOT CLOCK signals on lead 630 (two character cycles) to shift the representation out to the CRT display. However, if the video representation is read from the ASCII memory then only eight DOT CLOCK signals (one character cycle) are required to shift the representation out to the CRT. The signal GATED S/L on lead 726 goes low after eight or sixteen DOT CLOCK signals as required to load the digital video representation of the next character into the shift registers as soon as the digital video representation of the previous character has been shifted out.

Figure 10:
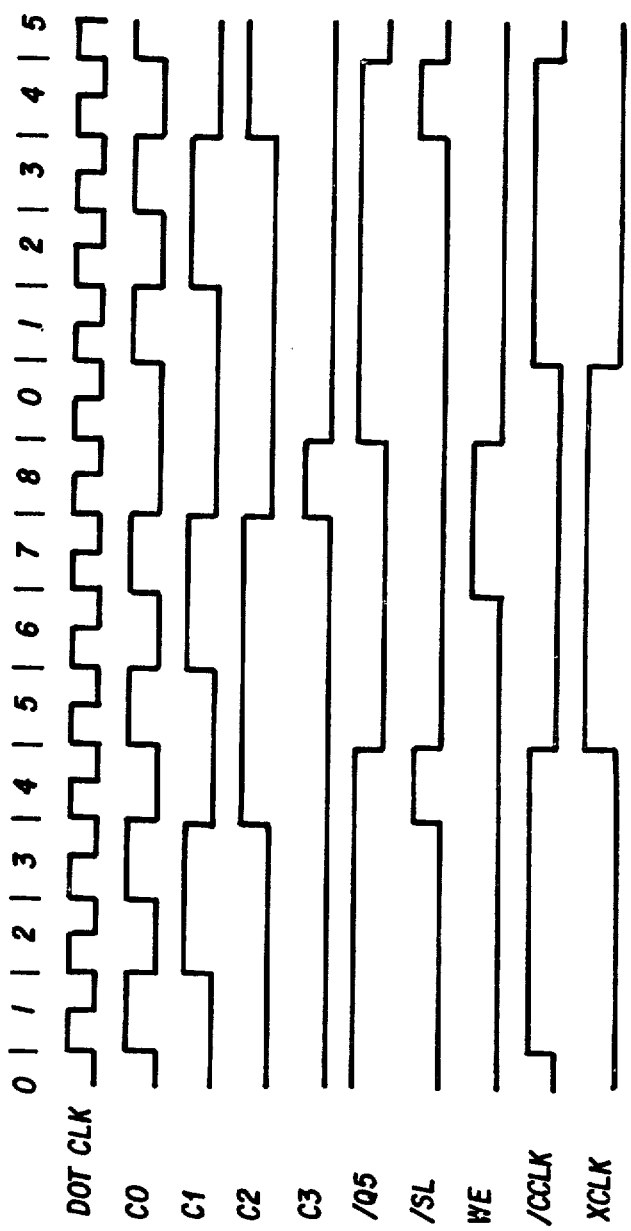
FIG. 10 is a waveform diagram illustrating the sequence of certain timing signals produced by the timing and control circuits.

As shown in FIG. 10, the signal SL is generated once each character cycle by PLA 604. This signal is applied to PLA 700 over lead 654 and if the CLDC is not in the Chinese mode the signal GATED S/L on lead 726 is driven low each character cycle to load the video representation of another character into the registers 414 and 416. Since the CLDC is not in the Chinese mode it is capable of displaying only ASCII characters so the registers should be loaded with the video representation of the next character as soon as the 8-bit video representation of the previous character has been shifted out of register 416. In this case the contents of register 414 are never sent to the CRT display.

A similar situation exists when the CLDC is in the Chinese mode but the character read from the character memory 302 is an ASCII character. In this case control memory 404 produces the signal ASCII CODE on lead 418. This signal causes PLA 700 to produce the signal ASCII (i.e. condition ASC true). Since the condition ASC is true, the PLA also produces the condition character phase, represented by a high level signal on lead 734. This signal is applied to he D input of flip-flop 704 which is set by the next CCLK signal on lead 726. The set condition of flip-flop 704 represents the VAL state. The output of the flip-flop is applied to PLA 700 which then drives the signal GATED S/L low when the signal S/L occurs on the next character, thereby loading the next character into registers 414 and 416.

As long as the character representations being applied to the shift registers are ASCII characters, the flip-flop remains set and causes the PLA 700 to produce the CHAR PH signal for setting the flip-flop on the next character cycle. However, if a Chinese character should be read out of the font memory or loadable font memory, the flip-flop is reset so that the signal GATED S/L is not produced on the following cycle. In this case the control memory will not output the signal ASCII CODE so the condition ASC will be false. The condition VAL is true so the PLA 700 drives the signal CHAR PH low. The flip-flop 704 is reset by this signal at the next CCLK so that the condition VAL is false. This prevents the PLA from driving the signal GATED S/L low, and thereby prevents the loading of another character into registers 414 and 416.

ATTRIBUTE CONTROL

As previously explained, as character memory 302 is addressed to generate the digital video representations of a character, the attribute memory 306 is read out to provide attribute control signals for controlling or modifying the digital video signals so as to obtain highlighting, underlining, reverse video, blinking, etc. The output of the attribute memory is clocked into register 326 and then into register 330 on successive clock pulses. From register 326 the attribute signals are applied over bus 340 to PLA 800. The PLA also receives the horizontal dot row addressing signals RA0X-RA3X and RA4 generated by video controller 600. If attribute bits 0-6 are all zero it indicates no display and the PLA generates a high level signal which is clocked into one stage of register 820 upon occurrence of the next Q5 clocking signal on lead 656. If bits AT4-AT6 are ones and bits AT0-AT2 are zeros it indicates the reverse video condition and the PLA produces the high level signal RVVX which is clocked into another stage of register 820.

The underline attribute is designated when attribute bit 0 is a one and attribute bits 1 and 2 are zeros. In this case the PLA 804 produces the signal UNDERLINEX for entry into register 820. UNDERLINEX is generated under two different conditions depending on whether the CLDC is, or is not, in the Chinese mode. If the CLDC is in the Chinese mode UNDERLINEX is produced when the horizontal dot row count is 17. If the CLDC is not in the Chinese mode then UNDERLINEX is produced when the horizontal dot row count is 12.

The signals stored in register 820 are applied to inputs of PLA 800 and modify the digital video output of shift register 416 to provide blanking, reverse video or underlining. The PLA 800 also receives the mode signal BLEN on lead 228 if blinking is to be permitted. Blinking can occur only when BLEN is true and attribute bit 7 is true. An 8-stage counter 822 counts VSYNC DLY pulses and produces a cursor blink signal when stage 4 is set and a blink signal when stage 5 is set. If attribute bit 3 is true it causes highlighting of a character. After entry into register 820 the signal is applied to PLA 800 to generate the signal HL. This signal passes over lead 812 to one of drivers 434 and, because of capacitor 450 causes highlighting of the character.

The effect in PLA 800 of the various attribute signals on the digital video signal SDOT should be evident from the logic equations for the PLA and are not described in detail for that reason.

Character Extension

The CLDC also provides vertical and horizontal character extension whereby the right side or bottom of a character may be extended by repeating the digital video representation of the rightmost column or lowermost row of dots of the character until the boundary of the matrix comprising the next character to the right or in the next row is reached. The control memory 404 is selectively burned in to produce the signal EXTENDED VERT which controls vertical extension, EXTENX which controls horizontal extension of ASCII characters, and EXTEN2 which controls the horizontal extension of Chinese characters.

EXTENDED VERT is applied over lead 422 to PLA 700 to produce the signal VERT EXTEND on lead 728. VERT EXTEND is applied to PLA 800 where it prevents generation of the signal BLANK. When the character scan reaches a count of 15 the video controller output RA4 selects MUX 670 so that RA0—RA3 on leads 604 have the value 15 even though the video controller advances the row address count through counts 16-19. Thus, the same digital video representation, corresponding to the bottom-most row of dots of the character, is repeatedly addressed in memory 308, 406 or 402 and applied to the shift registers 414 and 416.

EXTENX is generated by control memory 404 when an ASCII character is to be horizontally extended. EXTENX is applied over lead 424 to register 820 and is clocked into the register by the signal Q5. The register produces the signal EXTEN on lead 814 which is connected to PLA 700. EXTEN causes PLA 700 to repeat on lead 730 the value of bit 8 on the font memory bus. Lead 730 causes the signal HEXTEND1 which is applied to the low order of shift register 416 to repeat the value of bit 8 of the digital video representation of an ASCII character.

To extend a Chinese character the control memory 404 must produce the signal EXTEND2 on lead 426. This signal is applied to PLA 700 and causes the PLA to repeat the value of font bus bit zero on lead 728. The signal on lead 728 is the HEXTEND2 signal which is applied to the low order of shift register 414 to repeat the value of bit 0 of the digital video representation of a Chinese character.

Keyboard Interface Circuits

The keyboard is selected by the PC when it applies to the PC Bus an address in the range 20X where X is at least 8 (SA3=1). The address is applied to PLA 500 which produces the signal /KEYBOARD SEL on lead 542. /KEYBOARD SEL is applied to PLA 504 and generates either /KEYCONSELCT on lead 522 or /KEYDATSEL on lead 520 depending upon whether bit SA2 of the address is a one or a zero. /KEYCONSELCT is generated when it is desired to poll the keyboards in response to an interrupt request. /KEYDATSEL is generated when the PC desires to read data from a data register in the keyboard interface circuits 208. /KEYCONSELCT or /KEYDATSEL is applied to a PLA 908 in the keyboard interface circuits. As shown in FIG. 9, these circuits also include a serial shift register 902, a register 904, a flip-flop 906 and an inverter 910.

Eight bits of data, preceded by a start bit, are serially applied over lead 206 to the low order of shift register 902 each time a key is depressed or released. Clocking signals from the keyboard are inverted by inverter 910 and clock the shift register 902 and flip-flop 906. The start bit preceding the data bits when a key is depressed is a one. It is shifted through register 902 and sets flip-flop 906 as the last or high order data bit is shifted into the register.

When the flip-flop 906 is set its output CHAR is applied to PLA 908 which generates the signal LCHAR to clock the byte of data from register 902 into register 904. PLA also produces the signal /CCHAR to clear flip-flop 906 and register 902.

CHAR causes the PLA 908 to produce a high level signal IRQX which is applied to three jumpering connections which are jumpered to provide the desired interrupt priority level for the keyboard. These signals are applied over leads 900 to the PC Bus and pass through connector 200 to the PC. The PLA 908 also generates the signal SD0 which is placed on bit 0 of the PC Bus when /KEYCONSEL is decoded.

When the PC receives an interrupt request it polls all keyboards by addressing them to generate /KEYCONSEL and read register 904. Upon recognizing the 1-bit on SD0 the PC produces an address which, when applied to PLA 504, generates /KEYDATSEL.

When /KEYDATSEL goes low it immediately enables the output of register 904 to place the byte of data on the PC Bus.

SUMMARY

In summary it is seen that the present invention provides means whereby multiple keyboards and displays may share a single PC. Attachment of a keyboard or display is made directly to a CLDC, there being one CLDC for each keyboard/display station. The CLDC controls the display of ASCII or Chinese characters or a mix of the two. Yet it is fully compatible with many PCs. The loadable memory simplifies the task of handling special or uncommon characters since it may be loaded to suit the needs of a particular application. Furthermore, through provision of the translator memory it is possible to use a much smaller font memory than would otherwise be required where a font of characters is represented by code values in a loosely populated set.

While the invention has been described in terms of the Chinese GB-2312 code, its principles are equally applicable to other codes. Thus, Japanese or other languages may be displayed either alone or intermixed with ASCII characters. However, the font memory 406, translator memory 410 and control memory 404 must be replaced with equivalent memories programmed or burned in in accordance with the particular code to be employed. Other modifications of the described embodiment will be obvious to those skilled in the art. It is intended therefore to be limited only by the scope of the appended claims.

APPENDIX

PLA 1

Element 502

```
IF(SSEL)  /D0=/HSDLY
IF(SSEL)  /D1=SSEL + /SSEL
IF(SSEL)  /D2=SSEL + /SSEL
IF(SSEL)  /D3=/LVD
CMS=  SMEMR*SA19*/SA18*SA17*SA16*/SA15*BS
    + SMEMW*SA19*/SA18*SA17*SA16*/SA15*BS
CCG=  CMS*/SA0
ATG=  CMS*SA0
DG=   3BX*E*BS
    + SMEMR*SA19*/SA18*SA17*SA16*/SA15*BS
    + SMEMW*SA19*/SA18*SA17*SA16*/SA15*BS
```

PLA 2

Element 500

```
3BX=   /AEN*/A6*A8*A9*A4*A5*A7*BS
SSEL=  3BX*IOW*A3*/A0*A1
     + 3BX*IOR*A3*/A0*A1
/E=    /IOW*/IOR
CS45=  3BX*/A3*BS
/DDIR= AEN*/MEMR + /IOR*/MEMR
```

SEL1= 3BX*IOW*A3*/A0*A1
+ 3BX*IOR*A3*/A0*A1
BRS= IOW*A9*/A8*/A7*/A6*/A5*/A4*/A3*/AEN
KBDS= IOW*A9*/A8*/A7*/A6*/A5*/A4*A3*/AEN
+ IOR*A9*/A8*/A7*/A6*/A5*/A4*A3*/AEN

PLA 3

Element 602

C1= /RST*CRS
D1= /RST*DPE
/DDPE= /D1 + RST
/DCRS= /C1 + RST + /DCRS*/CP
CLV= /D1*/RST*/DDPE
HI= HSN*/RST
/DHSN= /HI
DVSN= VSN

PLA 4

Element 604

C0= /C0*/RST*/C3
C1= C0*/C1*/RST + C1*/C0*/RST
C2= C0*C1*/C2*/RST + C2*/C0*/RST + C2*/C1*/RST
C3= C0*C1*C2*/C3*/RST
/Q5= RST + /C2 + C3
/SL= C0*C1*/C2*/C3
WE= XCLK*MEMW*C0*C1*C2
+ XCLK*MEMW*/C0*C1*C2

PLA 5

Element 606

CCLK= C2 + C3
/CCLK= /C2*/C3

```
/XACK=  /CMS*/3BX
      + /CMS*/E
      + /XACK*/XCLK
      + /XACK*C0
      + /XACK*C1
      + /XACK*C2
      + /XACK*C3
/XCLK=  /CMS*/3BX*/XCLK
      + /CMS*/E*/XCLK
      + /C0*/XCLK
      + /C1*/XCLK
      + C2*/XCLK
      + /C0*/C1*/C2*/C3
      + XACK
IOREN=  CMS + 3BX*E
/CACS=  /XCLK + /C2*/C3 + 3BX*E
ATSEL=  3BX*E
      + /XCLK
      + /C2*/C3
      + A0X
```

PLA 6

Element 804

```
NDSPL=  /AT0*/AT1*/AT2*/AT4*/AT5*/AT6
RVV=    /AT0*/AT1*/AT2*AT4*AT5*AT6
UDL=    AT0*/AT1*/AT2*RA3*RA2*/RA1*/RA0*/CM
      + AT0*/AT1*/AT2*RA4*RA0*CM
/HDR=   /HSD + /HSEN
```

PLA 7

Element 800

```
BLANK=  NDSPL
      + EOS
      + RA4*/UDL*/VEXT
```

```
        + BLNK*/DCRS*AT7Y*BLEN
BW=  SDOT*/BLANK*/RVV*DDEN
     + UDL*/BLANK*/RVV*DDEN
     + DCRS*CBLNK*/RVV*DDEN
     + /UDL*/DCRS*RVV*DDEN*/SDOT
     + BLANK*/DCRS*RVV*DDEN
     + /UDL*/CBLNK*RVV*DDEN*/SDOT
     + BLANK*/DCRS*RVV*DDEN
/HL=  /DDEN
     + BLANK
     + /IF
     + /SDOT*/UDL*/DCRS
     + /SDOT*/UDL*/CBLNK
```

PLA 8

Element 700

```
/GSL=  /SL*VAL + /SL*/CM
ASC=   ASCC + /CM
CH0=   /ASCC*/LOAD*/BKSEL*CM
CH1=   /ASCC*/LOAD*BKSEL*CM
/HEX1= VAL*/FONT8*/HEX2
     + VAL*/EXEN*/HEX2
     + /QH2*/VAL
     + /QH2*HEX2
     + /QH2*/FONT8
     + /QH2*/EXEN
/HEX2= /HEX2*SL
     + /HEX2*/EXEN2*VAL
     + /HEX2*/FONT0*VAL
     + /HEX2*ASC*VAL
     + /SL*VAL*/EXEN2
     + /SL*VAL*/FONT0
     + /SL*VAL*ASC
/VEX=  /EXV*/VEX
     + SL*/VEX
```

+ /VAL\*/VEX
+ /EXV\*/SL\*VAL
/CP= /ASC\*VAL

PLA 9

Element 504

LD0= A0\*BRS\*/RST
  + LD0\*/BRS\*/RST
LD1= A1\*BRS\*/RST
  + LD1\*/BRS\*/RST
BS= /LD0\*/ID0\*/LD1\*/ID1
  + LD0\*ID0\*/LD1\*/ID1
  + /LD0\*/ID0\*LD1\*ID1
  + LD0\*ID0\*LD1\*ID1
KDS= KBDS\*A2\*ID0\*ID1\*A0\*A1
  + KBDS\*A2\*ID0\*/ID1\*A0\*/A1
  + KBDS\*A2\*/ID0\*/ID1\*A0\*/A1
  + KBDS\*A2\*/ID0\*ID1\*/A0\*A1
KCS= KBDS\*/A2\*ID0\*ID1\*A0\*A1
  + KBDS\*/A2\*ID0\*/ID1\*A0\*/A1
  + KBDS\*/A2\*/ID0\*ID1\*/A0\*A1
  + KBDS\*/A2\*/ID0\*/ID1\*/A0\*/A1

PLA 10

Element 702

LCEN1= CMS\*LDLCS\*A0X\*CM
LCEN0= CMS\*LDLCS\*/A0X\*CM
LCW1= CMS\*LDLCS\*A0X\*WE\*CM
LCW0= CMS\*LDLCS\*/A0X\*WE\*CM
CHSEL= /LDLCS\*/A0X + /CM\*/A0X
ATSEL= /LDLCS\*ATSLX + /CM\*ATSLX
LOAD= LC\*CM\*/LDLCS
CINH=/D1\*/DPE

PLA 11

Element 908

```
PULSE= CHAR*/SYNC*HSD*KDS + PULSE*/SYNC + PULSE*/HSD*/KCS
SYNC= PULSE*/HSD + SYNC*/KDS
/LCHAR= /SYNC
CCHAR= SYNC*HSD + KDS
IF(PULSE) IRQX= PULSE
IF(SYNC) /KYDAT= SYNC
IF(KCS) /SD0= /SYNC
IF(DG) /IOCR= /XACK
```

The embodiments of the invention in which an exclusive property or privilege is claimed are defined below:

1. In a display system including a font memory for storing the digital video representations of the characters comprising a font of standard characters, a character memory for storing a subset of characters which is to be displayed, means responsive to said character memory for addressing said font memory to read therefrom the digital video representations of the subset, and display means responsive to said font memory for displaying said subset, the improvement comprising:
a loadable font memory for storing the digital video representations of special characters, said loadable font memory having an output connected to said display means;
means responsive to said character memory for addressing said loadable font memory whereby digital video representations of special characters are applied to said display means; and,
computer means and means responsive to said computer means for addressing said loadable font memory and applying data signals corresponding to said digital video representations thereto.

2. The improvement as claimed in claim 1, wherein said character memory comprises N addressable locations for storing first signals representing ASCII and ideographic characters, the first signals representing one of said ASCII characters being stored at one of said addressable locations and the first signals representing one of said ideographic characters being stored at two consecutive ones of said addressable locations, whereby the maximum number of characters which may be simultaneously stored in said character memory and displayed on said display means depends on the mix of ideographic and ASCII characters stored in said character memory.

3. The improvement as claimed in claim 1 wherein said font memory stores the digital video representations of ideographic characters, said improvement further comprising:
a read-only memory for storing the digital video representations of ASCII characters;
means responsive to said character memory for addressing said read-only memory to read therefrom the digital video representations of any ASCII characters in said subset; and,
means connecting the output of said read-only memory to said display means, whereby said display means displays any ideographic or ASCII characters in said character memory.

4. The improvement as claimed in claim 3 and further comprising means responsive to said computer means for selectively addressing and loading characters into said character memory whereby the subset stored therein is modified.

5. In a system wherein a font of characters is represented by a first set of non-consecutive numeric values, each character of said font being represented by a numeric value in said first set, the improvement comprising:
a display means;
first means for producing first signals representing a subset of said font of characters to be displayed on said display means, said first signals representing numeric values in said first set;
a character memory responsive to said first means for storing said first signals;
translator means responsive to signals representing numeric values in said first set for generating second signals representing numeric values in a second set, the numeric values of said second set being consecutive and each representing one character of said font;
means for applying said first signals from said character memory to said translator means whereby said translator means generates second signals representing characters of said subset;
a font memory for storing the digital video representation of each character of said font;
means for applying the second signals generated by said translator means to said font memory as addresses whereby third signals corresponding to the digital video representation of the characters of said subset are read from said font memory; and,
means for applying said third signals to said display means to display the characters of said subset.

6. The improvement as claimed in claim 5 wherein the numeric values in said first set comprise X binary bits and the numeric values in said second set comprise Y binary bits, Y being less than X.

7. The improvement as claimed in claim 5 and further comprising a second memory addressable in parallel with said character memory by said first signals for producing attribute signals representing attributes of characters in said subset; and,
means connected between said font memory and said display means and responsive to said attribute signals for modifying the digital video representation of characters of said subset before applying the modified representation to said display means.

8. The improvement as claimed in claim 5 and further comprising:
    an ASCII memory for storing digital video representations of ASCII characters;
    a control memory for storing signals representing control codes;
    means for applying said first signals from said character memory as addressing signals to said control memory and said ASCII memory;
    means responsive to said control memory for selectively inhibiting said ASCII memory in accordance with a control code read from said control memory; and,
    means for applying said digital video representations of ASCII characters to said display means.

9. The improvement as claimed in claim 5 and further comprising:
    computer means;
    a loadable font memory;
    means responsive to said computer means for loading signals representing a font of special characters into said loadable font memory;
    means connecting said character memory to said loadable font memory whereby said first signals address said loadable font memory to read signals therefrom; and,
    means for applying signals read from said loadable font memory to said display means.

10. The improvement as claimed in claim 5, wherein said character memory comprises N addressable locations for storing first signals representing ASCII and ideographic characters, the first signals representing one of said ASCII characters being stored at one of said addressable locations and the first signals representing one of said ideographic characters being stored at two consecutive ones of said addressable locations, whereby the maximum number of characters which may be simultaneously stored in said character memory and displayed on said display means depends on the mix of ideographic and ASCII characters stored in said character memory.

11. In a system wherein a font of characters is represented by a first set of non-consecutive numeric values, each character of said font being represented by a numeric value in said first set, and a subset of said font of characters is displayed on a display means by addressing a font memory to read out from said font memory to said display means the display video representations of the characters of said subset, the method of reducing the size of font memory required to store the digital video representations of said characters of said font, said method comprising:
    applying first signals representing said subset of font characters to a first memory for storage, said first signals representing numeric values in said first set;
    reading out said first signals from said first memory;
    translating said first signals read from said first memory into second signals representing numeric values in a second set, the numeric values of said second set being consecutive and each representing one character of said font; and,
    applying said second signals as addressing input to said font memory to read therefrom to the display means the digital video representations of the characters of said subset.

12. The method as claimed in claim 11, wherein said first signals are repeatedly read out from said first memory.

* * * * *